Sept. 21, 1943.  F. W. SIDE ET AL  2,330,082
RECORDING APPARATUS
Filed Dec. 15, 1938
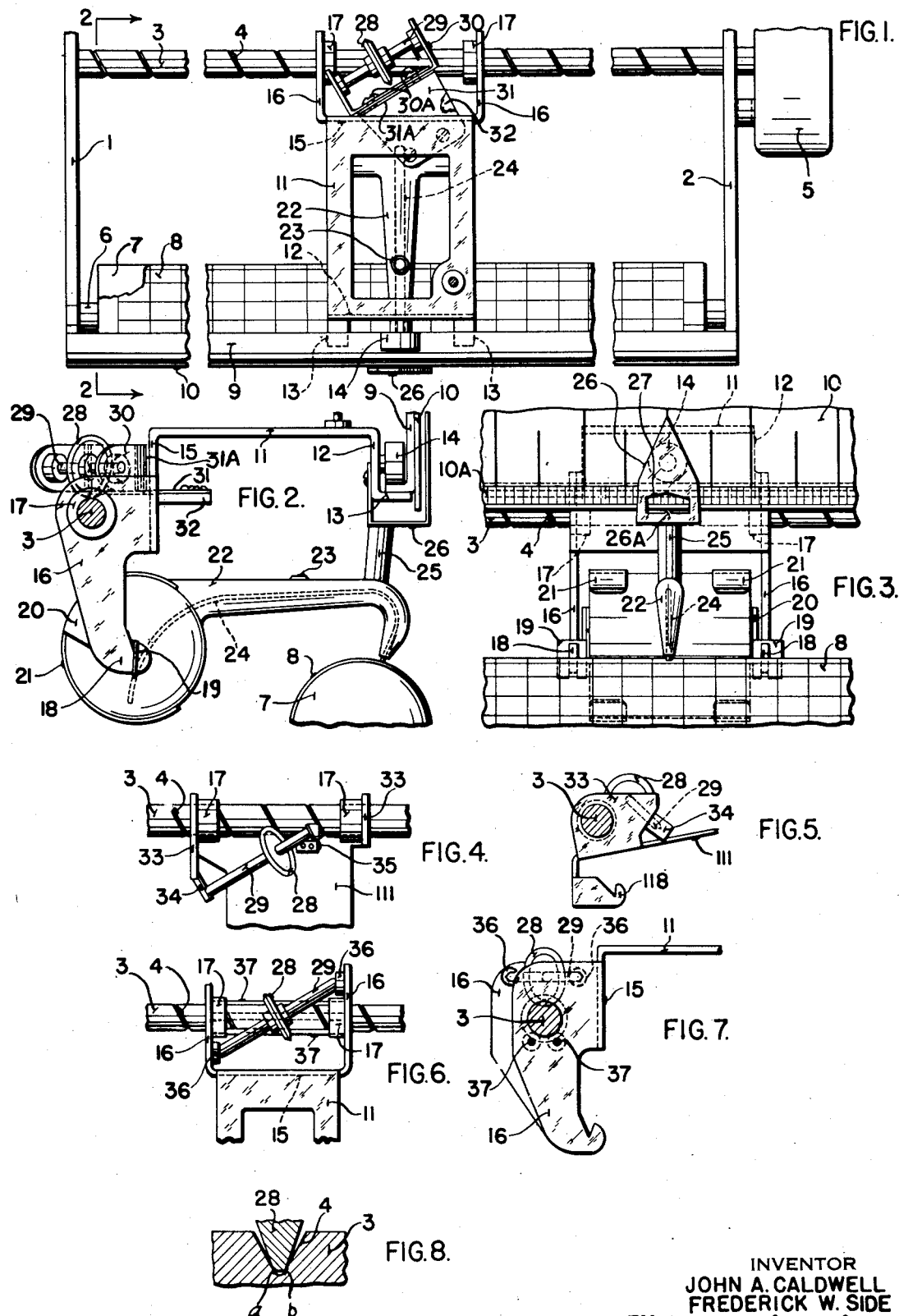
INVENTOR
JOHN A. CALDWELL
FREDERICK W. SIDE
BY
ATTORNEY Patented Sept. 21, 1943

2,330,082

UNITED STATES PATENT OFFICE 2,330,082

RECORDING APPARATUS

Frederick W. Side and John A. Caldwell, Philadelphia, Pa., assignors to The Brown Instrument Company, Philadelphia, Pa., a corporation of Pennsylvania Application December 15, 1938, Serial No. 245,930

11 Claims. (Cl. 74—57)

The present invention relates to measuring instruments, and more particularly to a supporting means for moving a recording pen across a chart upon which a record is to be made.

In modern high speed recording instruments, great difficulty has been experienced in developing a pen carriage that may be rapidly and smoothly moved across a chart in response to variations in a condition, the value of which is to be recorded. This difficulty was due in part to the inertia of the pen carriage itself and also to mechanical features of the carriage and its driving means.

It is an object of our invention to provide a pen carriage that may be easily and smoothly moved across a chart at high speed, and one in which friction losses are negligible. It is a further object of our invention to provide a pen carriage in which the follower thereof may, upon encountering some obstruction, be disconnected from the driving shaft without injury to either.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which we have illustrated and described a preferred embodiment of the invention.

In the drawing:

Fig. 1 is a top view of our novel pen carriage and its associated structure;

Fig. 2 is a view taken on line 2—2 of Fig. 1;

Fig. 3 is a view looking from the right of Fig. 2;

Figs. 4 and 5 are top and side views of another embodiment of the invention;

Figs. 6 and 7 are top and side views of still another embodiment of the invention; and Fig. 8 is an enlarged sectional view to show the relation of the drive shaft to the follower.

Referring to Fig. 1 there are shown side plates 1 and 2 of any suitable recording instrument which in practice are usually mounted in swinging relation to an instrument casing such as is shown in Patent 2,093,119 issued to Coleman B. Moore. Extending between these side plates and journaled for rotation therein is a shaft 3 provided with a helical groove 4. This shaft is driven from a reversible motor 5 that is mounted on the outside of plate 2. The motor 5 may be energized for rotation in either direction in response to measurements made of the value of a condition by some means such, for example, as that shown in Patent No. 2,245,034 issued June 10, 1941, to Thomas R. Harrison. Rotation of the shaft 3 is utilized to move a pen carriage to various positions between the side plates proportional to the value of the condition being measured and recorded.

Also journaled in the side plates 1 and 2 is a shaft 6 to which is attached a chart drum 7. The drum is driven at a constant or variable speed by any desired driving means and serves to advance a chart 8 upon which is made a record of the value of the condition being measured. Located above the chart drum 7 and also extending between the side plates is an angle member 9 to the front of which is attached a scale 10 that is provided with indicia, preferably corresponding to that on the chart.

Supported for movement along the shaft 3 and member 9 is a pen carriage 11 that is preferably made of sheet metal cut and bent to the form shown. The body proper of the carriage is bent downwardly at its front portion as shown at 12 from which extend two forwardly projecting tongues 13 that lie under the horizontal part of member 9. The front end of the carriage 11 is supported on angle member 9 by a roller 14 that is journaled on a small shaft that projects forwardly from the vertical portion 12. The tongues 13 cooperate with the roller 14 to prevent any possibility of the carriage rising up from member 9 and thereby vibrating or chattering as it is shifted along above the chart.

The rear portion of the carriage 11 is bent downwardly as shown at 15 and has extending therefrom on each side a supporting portion 16 that is provided with openings to receive the threaded shaft 3. The openings are preferably provided, as shown, with bronze bushings 17 that surround the shaft 3 and form supporting bearings for the carriage. The lower ends of the portions 16 are provided with hooked ends 18 that receive the ends 19 of a sheet metal part 20 forming a pen support.

The member 20 is provided with spring clips 21 which encircle the barrel or reservoir of a fountain pen 22 that is used to make the record line of the chart 8. The pen 22 is provided with an opening 23 in its neck portion by which it may be filled, the ink running through the neck to the reservoir. Ink is fed from the reservoir to the chart by means of a capillary tube 24 that extends from the bottom of the reservoir through the neck portion of the pen to and through an opening in the front turned-down end of the neck. The writing tip of the capillary is preferably made of some very hard material so that the wear thereon will not be excessive. In order to prevent the pen from bouncing off the chart as it is moved therealong a buffer member 25 made of resilient material is inserted between the outer end of the neck portion of the pen and the under side of a pointer 26. The pointer is attached to the portion 12 of the carriage and extends forwardly beneath angle member 9 and upwardly in front of scale 10, the upstanding portion of which pointer is formed to indicate from a distance the position of the pen carriage along scale 10. The pointer is also provided with an opening 27 which has a secondary indicating member 26A which cooperates with a finer set of scale markings 10A so that upon close inspection the exact position of the pen carriage 11 relative to scale 10 and chart 8 may be determined.

The pen carriage is moved across the chart by means of engagement between the groove 4 on the shaft 3 and a hardened steel roller 28. This roller is mounted on a shaft 29 that is journaled in the arms of a yoke 30 which is formed of two L-shaped members that are connected by screws 30A. The journals are preferably provided with small ball bearings to reduce rolling friction to a minimum. A support for the yoke 30 is provided by the turned up end 31A of a flat spring member 31 which is fastened at its other end to a member 32. It is to be noted that portion 31A of the spring may be fastened to the yoke 30 in any suitable manner, but preferably by the screws 30A which serve to hold the portions of the yoke together.

The member 32 upon which the spring 31 is mounted is a portion of carriage 11 that is bent forwardly from downwardly bent portion 15. It should be noted that spring 31 is fastened to member 32 at points a line through which is parallel to the shaft 29 upon which the roller 28 is mounted, and the spring 31 extends approximately tangent to the shaft 3. Since, as shown, the radius of wheel 28 is greater than the distance between shafts 29 and 3, this mounting permits the spring to exert at all times a force on the roller 28 which is perpendicular to the groove 4 at the point of contact between the groove and roller.

In Fig. 3 is shown an enlarged view of the roller 28 and its relation to the shaft 3. It will be seen that the angle of the groove is larger than that of the roller and that the latter does not come to a point. By forming the roller and groove rolling contact at points a and b is obtained with a corresponding reduction of friction between the two.

There is shown in Figs. 4 and 5 another form which the support for the roller 28 may take. In this embodiment of the invention the pen carriage 111 extends at a slight angle to the horizontal and is provided at its back end with downwardly and forwardly extending hook portions 118 adapted to support the pen in a manner already described. A pair of ears 33 are bent upwardly from the rear portion of the pen carriage and they are provided with openings to receive the bushings 17 which surround the shaft 3. A support for one end of the shaft 29 which supports the roller 28 is provided by a part 34 extending from and at a slight angle to the left ear member 33. The other end of shaft 29 is supported by a spring member 35 that is riveted or welded to the carriage and projects upwardly therefrom. The upper end of the spring 35 is formed as a socket to receive a pointed end of shaft 29 and is bent over slightly as shown until it is perpendicular to the shaft 29. The spring resiliently forces the shaft 29 toward its other bearing in part 34 and at the same time exerts a force on roller 28 to keep it in engagement with the groove 4.

In each of the above described forms of the invention a spring has been used to keep the roller 28 in the groove 4. Such an arrangement is desirable since if the motor 5 rotates the shaft 3 enough to move the pen carriage against one of the side plates the spring can give and permit roller 28 to run out of its groove without damaging either the roller or shaft. Often in very high speed recorders a whipping action of the shaft 3 is produced and in such a case the spring support for the follower roller will permit the roller to give enough to absorb the shocks without damage to the instrument.

In some cases it is desirable to have a more rigid engagement between the follower 28 and the shaft 3. At such times a form of pen carriage such as that shown in Figs. 6 and 7 may then be used. In those figures the pen carriage 11 takes the same shape as in Fig. 1 except that one of the members 16 extends rearwardly further than the other for a purpose to be described. In this form of the invention the shaft 29 is supported for rotation in a plane parallel to that of the shaft 3 and with the axis of the shaft perpendicular to the helical groove 4. The shaft 29 is mounted for rotation in sockets 36, one of which is located on each of the members 16. The ends of the shaft 29 is preferably pointed so that the shaft may revolve in the sockets with a minimum of friction, or the shaft may be mounted in small bearings if desired. The roller 28 is kept firmly in engagement with the groove 4 and the pen carriage is kept steady by means of a pair of parallel backing rollers 37 that are journaled in the members 16 and in engagement with the shaft 3. Because of their line contact with the shaft 3 the friction made by the rollers 37 is negligible.

From the above description it will be seen that we have invented a pen carriage that may be easily assembled for use on a recorder. This pen carriage has the important advantage that it is light in weight and practically frictionless in its operation. The manner in which the roller 28 is mounted insures that it will at all times be held in its groove and that the force necessary to propel the carriage from the roller is reduced to a minimum. This is of especial advantage in high speed recorders where the shaft 3 is rotated at a high speed between rather sudden starts and fast stops. The pen carriage of our invention may, however, be used to advantage on any type of strip chart recording and indication instrument.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a recording instrument the combination with a supporting member, a threaded shaft extending parallel thereto, a carriage mounted to move along said shaft, means to rotate said shaft and means to translate rotating movement of said shaft into longitudinal movement of said carriage, said means comprising a rotatable disc to engage the thread on said shaft and means on said carriage to support said disc perpendicular to said thread and to resiliently maintain it in engagement with said thread.

2. In a recording instrument, a threaded shaft adapted to be rotated, a support parallel to said shaft, a carriage slidably mounted on said shaft and support, driving means between said shaft and carriage comprising a rotatable part, supporting means for said part comprising a stationary bearing and a resilient bearing, the latter forcing said supporting means toward the stationary bearing and forcing said part against said shaft.

3. In a measuring instrument, the combination with a threaded shaft rotated an amount proportioned to the value of a condition, a supporting member parallel to said shaft, a carriage supported by said shaft and member for movement axially thereof, driving means to cause movement of said carriage by rotation of said shaft, said driving means comprising a roller, a shaft upon which said roller is rigidly mounted, supporting means on said carriage for each end of said shaft, said supporting means holding said shaft in a plane parallel to the axis of the threaded shaft with the roller parallel to the thread at the points of contact and engaging the same.

4. In a measuring instrument, the combination with a threaded shaft rotated an amount proportioned to the value of a condition, a supporting member parallel to said shaft, a carriage supported by said shaft and member for movement axially thereof, driving means to cause movement of said carriage by rotation of said shaft, said driving means comprising a disc shaped roller adapted to engage the thread of said shaft and move said carriage as the threaded shaft is rotated, means to properly support said roller on said carriage comprising a shaft upon which said roller is mounted, bearings carried by said carriage for supporting the last named shaft so that the roller is positioned parallel to the thread in the threaded shaft at the points of contact between the roller and thread.

5. In a measuring instrument, the combination with a threaded shaft rotated an amount proportioned to the value of a condition, a supporting member parallel to said shaft, a carriage supported by said shaft and member for movement axially thereof, driving means to cause movement of said carriage by rotation of said shaft, said driving means comprising a spring attached to said carriage, a yoke member on said spring, a roller mounted for rotation in said yoke and adapted to engage the thread of said shaft.

6. In a measuring instrument having a shaft rotated an amount proportional to the value of a condition, said shaft having a helical thread of V-shape formed along its surface, a carriage mounted to move along said shaft, means to rotate said shaft and means to translate rotating movement of said shaft into longitudinal movement of said carriage, said last means comprising a rotatable disc having beveled edges mounted on said carriage for engagement with the thread on said shaft, the angle between the edges of said disc being smaller than the angle of the V-thread.

7. In a measuring instrument the combination of a shaft having a V-shaped helical groove on its surface, means to rotate said shaft an amount proportional to the value of a measurable condition, a carriage mounted for movement axially of said shaft, means on said carriage engaging with said shaft to shift the carriage upon rotation of the shaft, said means comprising a rotatable disc provided with beveled edges received in the groove of the threaded shaft, the angle between the edges of the disc being smaller than the angle of said V-shaped groove, and means to resiliently hold the disc in engagement with the groove.

8. In a measuring instrument, the combination of a threaded shaft rotated an amount proportional to the value of a variable condition, a supporting member extending parallel to said shaft, a carriage supported by said shaft and member for movement axially thereof, driving means to cause movement of said carriage by movement of said shaft, said driving means comprising a member on said carriage, a spring fastened to said member, a yoke member supported by said spring, a shaft, bearings for said shaft in said yoke and a roller to engage the thread of said threaded shaft mounted on the shaft supported by said yoke, engagement of the roller with the thread serving to move said carriage as said threaded shaft rotates.

9. In a measuring instrument, the combination of a threaded shaft rotated an amount proportional to the value of a variable condition, a member extending parallel to said shaft, a carriage mounted on said shaft and member for movement in a direction axially of said shaft, a roller rotatably mounted on said carriage for engagement with the thread on said shaft, whereby upon rotation of said shaft said carriage will be moved axially thereof, and means to support said roller comprising a shaft upon which it is mounted, a first rigid bearing for the roller shaft, a second resiliently mounted bearing for the roller shaft adapted to force the roller shaft toward the stationary bearing, said bearings being so located on said carriage that the roller is parallel to the thread on said threaded shaft.

10. In a measuring instrument, the combination of a threaded shaft adapted to be rotated various amounts, a supporting member parallel to said shaft, a carriage supported on said shaft and member for movement axially of said shaft amounts proportional to the rotational movement of said shaft, driving means to cause movement of said carriage by rotation of said shaft, said driving means comprising a roller, a shaft upon which said roller is rigidly mounted, supporting means on said carriage for each end of said shaft, said supporting means holding said shaft in a plane parallel to the axis of the threaded shaft with the roller parallel to the thread at the points of contact and engaging the same.

11. In a measuring instrument having a shaft adapted to be rotated various amounts, said shaft having a helical thread of V-shape formed along its surface, a carriage mounted to move along said shaft amounts proportional to the rotation thereof, means to translate rotating movement of said shaft into longitudinal movement of said carriage, said last means comprising a disc mounted on the carriage for engagement with the thread on said shaft, said disc being formed at its edge with a truncated angle between its faces that is smaller than the angle of the V-shaped thread.

FREDERICK W. SIDE.
JOHN A. CALDWELL.